(12) United States Patent
Andersson

(10) Patent No.: US 6,330,461 B1
(45) Date of Patent: Dec. 11, 2001

(54) MOBILE TELEPHONE APPARATUS

(75) Inventor: Håkan Andersson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/090,232

(22) Filed: Jun. 4, 1998

(30) Foreign Application Priority Data

Jun. 6, 1997 (SE) .................................................. 9702163

(51) Int. Cl.⁷ ............................................................ H04B 1/38
(52) U.S. Cl. ................... 455/566; 455/550; 455/575; 455/90; 455/567; 200/314
(58) Field of Search ............................... 455/566, 550, 455/575, 90, 567; 340/815.73, 815.48; 200/310, 314; 379/370, 396

(56) References Cited

U.S. PATENT DOCUMENTS

| | | |
|---|---|---|
| 3,766,350 | 10/1973 | Van Dyk et al. . |
| 4,056,701 | 11/1977 | Weber . |
| 4,262,182 | 4/1981 | Basler . |
| 4,493,958 | 1/1985 | Hamilton et al. . |
| 4,621,373 | 11/1986 | Hodsdon . |
| 4,761,823 | 8/1988 | Fier . |
| 4,823,397 | 4/1989 | Hewitt . |
| 5,034,602 | 7/1991 | Garcia, Jr. et al. . |
| 5,077,832 | 12/1991 | Szczutkowski et al. . |
| 5,180,050 | 1/1993 | Rada et al. . |
| 5,201,067 | 4/1993 | Grube et al. . |
| 5,204,502 | 4/1993 | Ferris et al. . |
| 5,285,038 * | 2/1994 | Asher et al. .......................... 200/314 |
| 5,473,316 * | 12/1995 | Takaya ............................ 340/825.44 |
| 5,555,550 * | 9/1996 | Kaschke .............................. 455/566 |
| 5,570,025 * | 10/1996 | Lauritsen et al. ..................... 324/433 |
| 5,661,279 * | 8/1997 | Kenmochi ............................ 200/314 |
| 5,669,486 * | 9/1997 | Shima .................................. 200/314 |
| 5,697,493 * | 12/1997 | Sach et al. ........................... 200/314 |
| 5,966,671 * | 10/1999 | Mitchell et al. ..................... 455/575 |
| 6,018,671 * | 1/2000 | Bremer ................................ 455/567 |

FOREIGN PATENT DOCUMENTS

| | | |
|---|---|---|
| 0369110 | 3/1995 | (EP) . |
| 0 661 823 | 7/1995 | (EP) . |
| 07203526 | 8/1995 | (JP) . |

\* cited by examiner

*Primary Examiner*—Dwayne Bost
*Assistant Examiner*—Erika A. Gary
(74) *Attorney, Agent, or Firm*—Burns, Doane, Swecker & Mathis, L.L.P.

(57) ABSTRACT

A mobile radio station includes status indicators and control buttons. At least one of the indicators and at least one of the buttons are merged into a combined status indicating control button arrangement. Each arrangement includes a light device provided at a switch attached to a flex-film or a PCB, and pressure devices provided at the switch. The pressure devices end up in a transparent button.

20 Claims, 2 Drawing Sheets

MOBILE TELEPHONE APPARATUS

The present invention relates generally to mobile telephone apparatuses, and more particularly to mobile telephones provided with improved status indicators and control buttons.

BACKGROUND

For subscribers or users in radio networks, such as cellular networks or mobile telephone systems, satellite networks or local area networks, etc., the most important part is the mobile station. In order to meet the requirements from the subscribers, the mobile station has to be small and compact enabling the user to carry and store the unit virtually anywhere.

For example, for usage in mobile telephone systems there are many different types of mobile telephones on the market, both with and without a foldable housing and with and without a movable antenna. Generally, a mobile telephone has a housing provided with an earpiece, a microphone, a display, and a keypad on the front and an antenna arranged on the top. The keypad has numbered buttons for dialing as well as buttons for different kinds of functions such as on/off, send, volume control, and buttons for answering SMS (Short Message Services, transmission of short text messages for presentation on the display), etc.

Further, mobile telephones are provided with indicators for different kinds of status information, such as a low battery indicator and an indicator showing whether the phone has established contact or not with a base station. The latter indicator is required on mobile telephones connected to most common mobile telephone systems based on the cellular architecture.

Cellular architecture or cellular network is a technique that involves subdivison of a service area into a number of small cells to facilitate frequency reuse and an increased number of subscribers in the future. The mobile telephone interface to the cellular network is a base station, usually located in the center of a cell. In order to establish or maintain a call between two subscribers in a cellular network, the mobile telephone has to be in contact with the base station. As each cell has a limited area, the mobile telephone has to be in contact with different base stations if it is moved out from one cell area to another. It is important for the subscriber to know if the mobile telephone has established contact with any base station, when he intends to establish a call. This information may be presented on the display or a specific indicator on the phone.

EP-A-661 823 describes a portable communication apparatus including an upper casing 1a and a lower casing 1b which are rotatably connected to each other. When the apparatus is folded, so that the upper casing 1a overlays the front surface of the casing 1b, minimum necessary keys on the lower casing remain exposed to the outside. The power key 9 is provided on the top of the upper casing 1a to prevent the user from operating the power key 9 by accident when the apparatus is folded.

JP-A-7-203526 shows a portable phone with a "singing stop key" SW2 provided at the top of the unfolded telephone. The position of the key, which stops the incoming call alarm, is different from the position of the other keys for enabling it to be operated even when a call comes in while the telephone is in a pocket or a bag.

Other well-known mobile telephones are provided with usually one status indicator on the top of its housing.

However, the above-mentioned prior art mobile radio stations and mobile telephones often have either an indicator or a button provided on the top of the telephone housing to enable certain functions and information to the subscriber even when the telephone (if it is foldable) is folded or when the telephone is in a passive state, often situated in a pocket or a bag. Since the top area of the housing gets smaller and smaller as the mobile telephones become smaller and smaller, the area on which externally arranged indicators and buttons can be provided is limited. Consequently, only a few indicators and buttons with just a few functions are available on top of the casing of currently produced mobile telephones.

SUMMARY

It is therefore an object of the present invention to provide a mobile telephone apparatus or mobile radio station with improved status indicators and control buttons arranged on the outside of the housing. Thus, important information and suitable functions, necessary for fast access, should be available on an easily accessible and centered location on the phone.

A mobile telephone is provided with status indicators and control buttons preferably on top of its housing. According to the present invention, at least one set of an indicator and a button is merged into a combined status indicating control button arrangement.

Simultaneously, the button arrangement can show whether the phone has established contact or not to a base station (indicator function) as well as being a button for regulation of e.g. strength of display light. A common indicator and button may also be a low battery indicator as well as a button for answering incoming SMSs and calls, or for diverting a call, or for regulating the speaker volume, or for on/off function, or for regulating the strength of the ring-signal (such as between a high and a low level, respectively). Further, it is an advantage of the button arrangement according to the present invention that it is visible in the dark.

BRIEF DESCRIPTION OF THE DRAWINGS

In order to explain the invention in more detail and the advantages and features of the invention in the following detailed description of preferred embodiments, reference is made to the accompanying drawings, in which.

DETAILED DESCRIPTION

Figure 1:
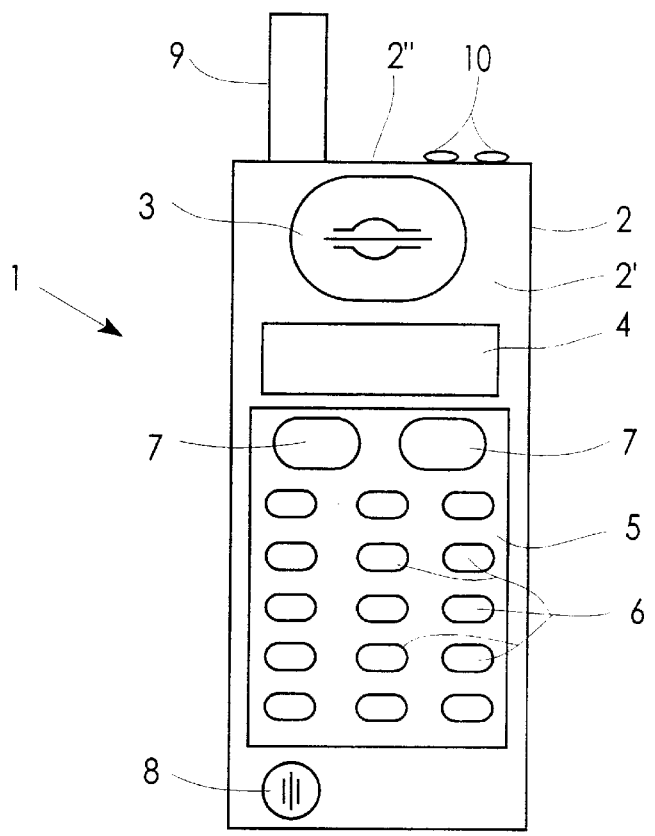
FIG. 1 is a front view illustrating a mobile telephone apparatus provided with combined status indicating control button arrangements according to the present invention.

With reference to FIG. 1 a conventional mobile telephone apparatus 1 includes a housing 2, which on its front side 2' is provided with an earpiece 3, a display 4 (e.g. an LCD-display), a keypad 5 with conventional buttons 6 for dialing and additional function buttons 7 such as on/off, send, clear etc, a microphone 8, and on a top side 2" of the housing an antenna 9. Further, combined status indicating control button arrangements 10 according to the invention are provided preferably on the top side 2" of the housing 2 or at one of the edges circumscribing the top side 2", the front top edge in FIG. 1.

In the following description the mobile telephone apparatus 1 or just the mobile telephone is used as an example of a mobile radio station and is not intended to be a limitation of the concept mobile radio station. Consequently, the mobile telephone can be exchanged for other radio communication apparatuses, e.g. a radio pager or a communicator, i.e. a telephone including a computer and a built-in calendar. This kind of apparatues can be used in a corresponding appropriate radio network, such as a cellular network, satellite network, a local area network, etc.

Figure 2:
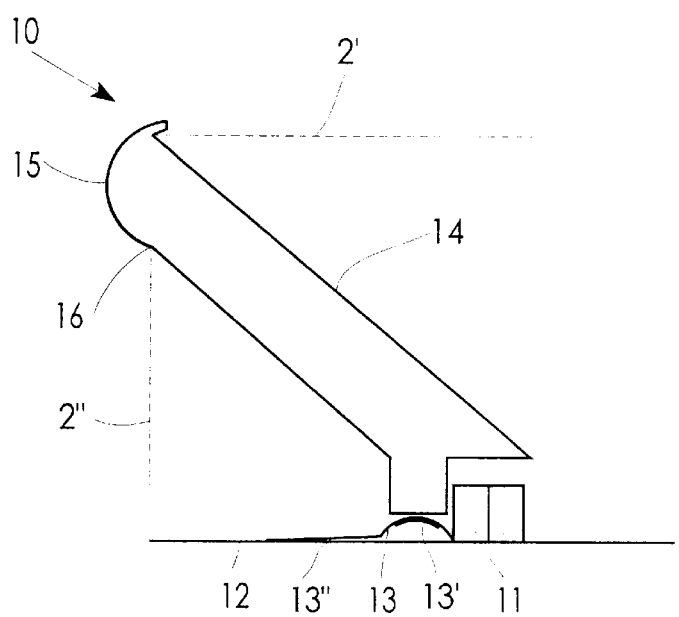
FIG. 2 is an enlarged cross sectional side view of a part of FIG. 1, illustrating a combined status indicating control button arrangement according to the invention with LED:s or an electroluminescent film as light means.

As shown in FIG. 2, each button arrangement 10 comprises light means 11, preferably LED:s (Light Emitting Diodes) or an EL (Electroluminescent) film, attached to a PCB 12 (Printed Circuit Board) or "flex"-film in the telephone. Further, adjacent to the light means 11 a switch 13, a pressure dome in the embodiment, is also attached to the PCB 12. The dome 13 is provided with a conductive layer 13' on its surface facing the PCB. Further, the dome 13 is attached to an extended insulating material layer 13", such as polyester, along the PCB. Pressure means 14, a combined light guide and pressure arm in the embodiment, is provided on top of both the light means 11 and the dome 13, and the arm ends up in a transparent button 15 provided in an aperture 16 in the housing 2. The light means 11 can generate either the same or different colours, for example red and green light, respectively.

By this combined status indicating control button arrangement, several fast activities can be utilized in order to enhance the procedure of controlling the telephone. Conventionally available status indicator information, such as whether the phone has established contact or not with the base station, can be presented by for example green pulsing light. During charging a green stable light is present, whereas a low battery level is indicated by red pulsing light, and at a red stable light the battery is not capable of supplying the phone with a sufficient power, so that the phone is switched off. With the present invention, these features can be supplemented with several other activities, for example to answer incoming SMSs and calls or to divert a call, or to control the speaker volume, strength of light, or an on/off function, or for regulating the strength of the ring-signal (such as between a high and a low level, respectively). Since the button arrangement also serves as a light indicator according to the invention the button 15 has to be transparent to a certain extent.

For example, if the user stores the phone 2 in his pocket, in order to answer an incoming call and consequently stop the ringing signal, the button 15, which is easy to find because of its location on the top of the phone, is depressed. By depression of the button 15 the arm 14 actuates the dome 13 and the conductive layer 13' engaging the PCB 12 and an electrical signal is generated. Then, the signal is detected by control circuits, not shown in the drawings, on the PCB 12, the circuits being used to control the function of the phone.

Figure 3:
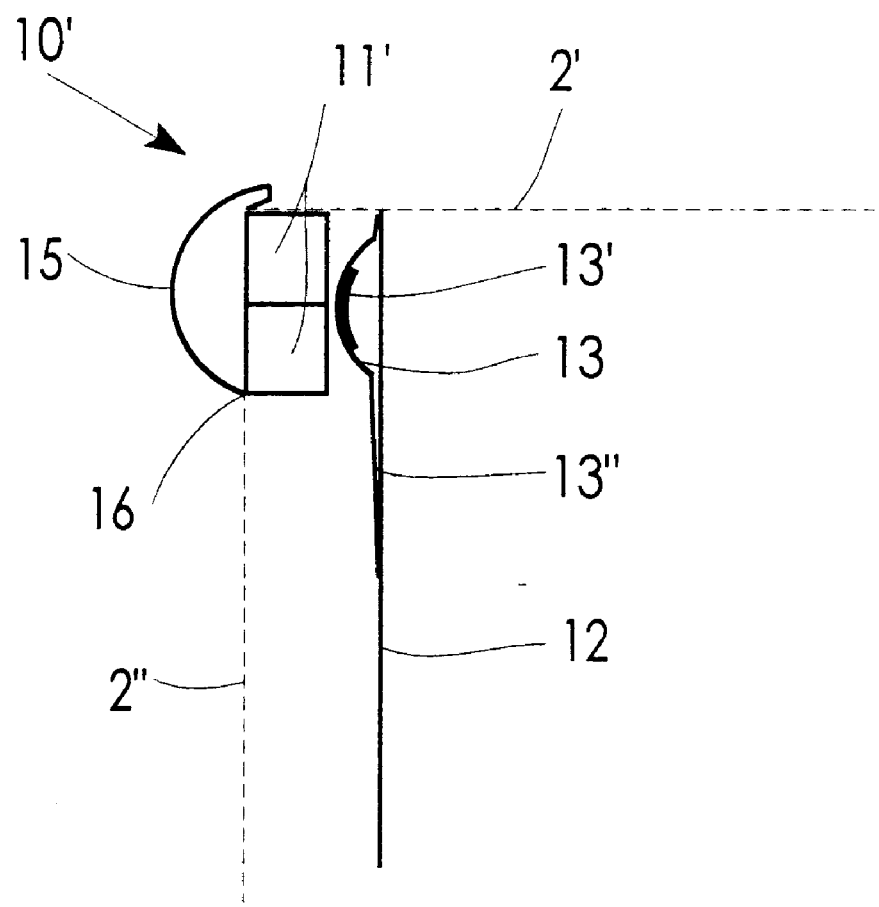
FIG. 3 is an enlarged cross sectional side view of a part of FIG. 1, illustrating a combined status indicating control button arrangement according to the invention with an electroluminescent film as light means.

In another embodiment shown in FIG. 3, an electroluminescent film is used as light means. As illustrated, the dome 13, the electroluminescent film or light means 11', and the button 15 are merged into an EL-button 10', which arrangement offers a much slimmer solution than the button arrangement 10, illustrated in FIG. 2. In this embodiment, the EL-button 10' comprises an electroluminescent film with two cells or light means 11' with different colours, which light means 11' serve as pressure means. The pressure dome 13 is attached to the PCB 12 in the telephone 1, the light means 11' is provided on the dome 13, and the button 15 is arranged on the light means 11'. It is also apparent that no light guide is needed. As for the embodiment in FIG. 2, the dome 13 of the current embodiment illustrated in FIG. 3 is attached to an extended insulating material layer 13".

To use this very principle when backlighting the LCD-display and the keypad having the same driver, a switch disconnecting the backlight from the EL-button 10', and a reduction of the driver-dutycycle is necessary, in order to prevent the light means 11' from being overloaded.

Thus, it should be apparent that the present invention provides a mobile telephone that fully satisfies the aims and advantages set forth above. Although the invention has been described in conjunction with specific embodiments thereof, alternatives, modifications and variations are apparent to those skilled in the art.

For example, the arrangement according to the invention can include light means with more than two different colours, and a combination of LED:s and EL-light means can be utilized.

In another embodiment of the present invention, not shown on the drawings, the button arrangement comprises an EL-film/LED:s attached to the PCB and adjacent to the EL-film an optical switch, such as a photo-diode/transistor, also attached to the PCB, and a transparent button covering both the EL-film and the photo-diode. When the user pushes the button he prevents light from reaching the photo-diode, and a signal is detected by control circuits on the PCB 12, the circuits being used to control the function of the phone. In this embodiment the button itself also constitutes the pressure means.

As described above, the switch 13 can be of different categories, e.g. mechanically, optically, or electrically controlled switches.

Accordingly, it is intended to embrace all such alternatives, modifications and variations that fall within the scope of the appended claims.

What is claimed is:

1. Mobile radio station comprising a keypad, status indicators and control buttons, wherein at least one of the indicators and at least one of the buttons are merged into a combined status indicating control button arrangement separate from the keypad, said arrangement including light means provided at a switch for indicating whether the mobile radio station has established contact with a base station, and pressure means provided at the switch, comprising a light guide in connection with the light means, and ending up in a transparent button for controlling a first function in stand by mode, a second function related to incoming calls or messages, and a third function related to ongoing calls in the mobile radio station.

2. Mobile radio station according to claim 1, wherein the transparent button is provided in an aperture of a housing of the mobile radio station.

3. Mobile station according to claim 1, wherein the light means is attached to a Printed Circuit Board (PCB) in the mobile radio station, the switch is attached to the PCB adjacent to the light means, and the combined light guide and pressure means are provided on the top of both the light means and the switch.

4. Mobile radio station according to claim 1, wherein the switch is attached to the Printed Circuit Board (PCB) in the mobile radio station, the light means is provided on the switch, and the button is arranged on the light means.

5. Mobile radio station according to claim 1, wherein the button arrangement is situated on the top of the mobile radio station.

6. Mobile radio station according to claim 1, wherein the light means is a LED.

7. Mobile radio station according to claim 1, wherein the light means is an electroluminescent film.

8. Mobile radio station according to claim 1, wherein the switch is a dome provided with a conductive layer on its surface facing a Printed Circuit Board (PCB).

9. Mobile radio station according to claim 1, wherein the switch is an optical switch.

10. Mobile radio station according to claim 1, wherein the mobile radio station is a mobile telephone apparatus.

11. Mobile radio station according to claim 1, wherein the mobile radio station is a radio pager.

12. Mobile radio station according to claim 1, wherein the mobile radio station is a communicator.

13. A mobile radio station according to claim 1, wherein the status indicator comprises a low battery indicator.

14. A mobile radio station according to claim 1, wherein the status indicator comprises an indicator for whether an SMS message is received or not.

15. A mobile radio station according to claim 14, wherein the control button is a control button for answering an incoming call or SMS message.

16. A mobile radio station according to claim 1, wherein the control button is a control button for controlling at least one of a speaker volume, a strength of a ring-signal, a backlight strength, and an on/off function.

17. A mobile radio station according to claim 1, wherein said first function is one of an on/off function and a display brightness control function.

18. A mobile radio station according to claim 1, wherein the second function controls a volume level of a ring-signal.

19. A mobile radio station according to claim 1, wherein the second function is a function which either answers or diverts an incoming call or SMS.

20. A mobile radio station according to claim 1, wherein the third function controls a volume of a speaker during a call.

* * * * *